April 26, 1955     A. L. STECK     2,707,044
ARTICLE GRIPPING AND TRANSFER MECHANISM
Filed Aug. 26, 1949     6 Sheets-Sheet 1

INVENTOR.
Arch L. Steck
BY William B. Jaspert
Attorney

April 26, 1955  A. L. STECK  2,707,044
ARTICLE GRIPPING AND TRANSFER MECHANISM
Filed Aug. 26, 1949  6 Sheets-Sheet 2

INVENTOR.
Arch L. Steck
BY William B. Jaspert
Attorney.

April 26, 1955 A. L. STECK 2,707,044
ARTICLE GRIPPING AND TRANSFER MECHANISM
Filed Aug. 26, 1949 6 Sheets-Sheet 3

INVENTOR.
Arch L. Steck
BY William B Jaspert
Attorney.

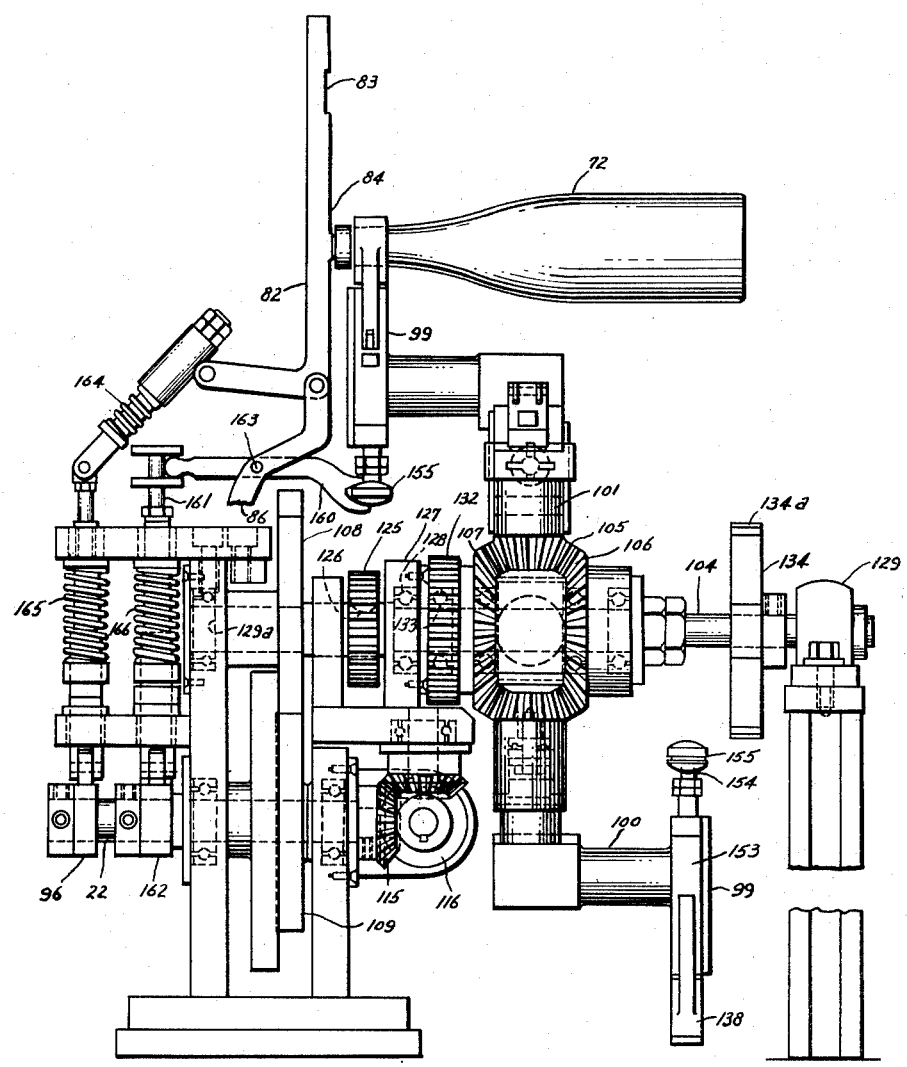

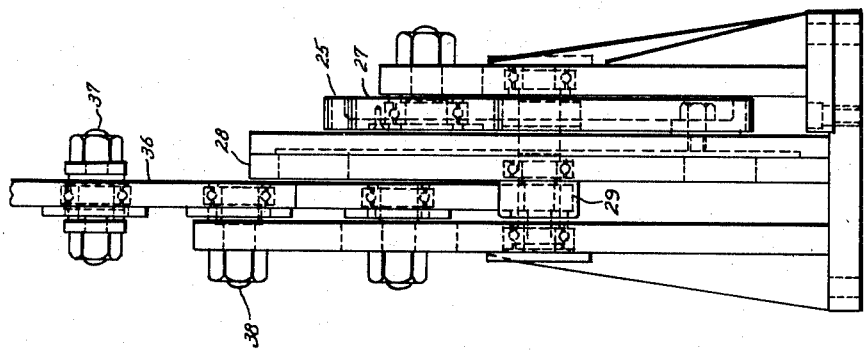
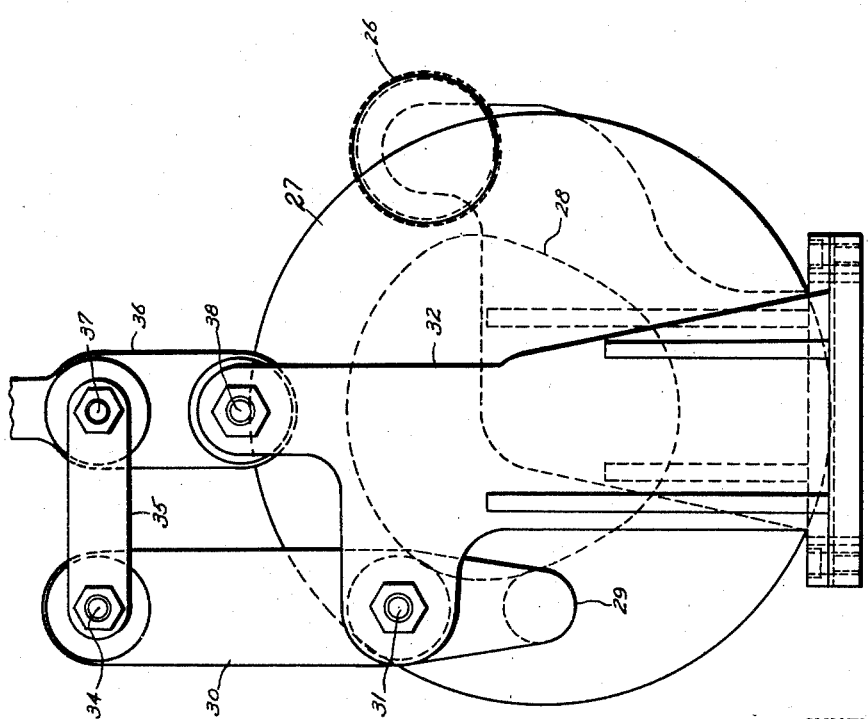

April 26, 1955        A. L. STECK        2,707,044
ARTICLE GRIPPING AND TRANSFER MECHANISM Filed Aug. 26, 1949        6 Sheets-Sheet 6

INVENTOR.
Arch L. Steck
BY William B. Jaspert
Attorney

United States Patent Office 2,707,044
Patented Apr. 26, 1955

2,707,044

ARTICLE GRIPPING AND TRANSFER MECHANISM

Arch L. Steck, Oil City, Pa., assignor, by mesne assignments, of one-half to Knox Glass Bottle Company, Knox, Pa., a corporation of Pennsylvania Application August 26, 1949, Serial No. 112,424

3 Claims. (Cl. 198—33)

This invention relates to new and useful improvements in labeling machines for printing on bottles, metal tube containers, and the like, and it is among the objects thereof to provide labeling machines of simple, compact construction which shall be adapted to engage the article to be labeled by firm gripping means, for transferring to the printing position, and for releasing the article at a suitable delivery station.

A particular object of the invention is to provide such apparatus which is adapted to engage a bottle, for example, standing upright on a conveyor, and move the same to a position in which the axis of the bottle will lie in a horizontal plane beneath a printing device, and after printing deposit the printed bottle in an upright position on a receiving platform such as a conveyor belt.

It is a further object of the invention to provide labeling machines of the above designated character employing color screens through which color is imparted on a bottle by a squeegee which is controlled to be inoperative when no bottle is in printing position, and which shall be capable of printing labels on the body and shoulder of a bottle simultaneously.

It is a further object of the invention to provide gripping mechanism for bottles or other articles which is capable of bodily moving the article angularly to four station positions in a vertical plane, reelase the bottle or tube when it is in line with the printing mechanism so that the bottle or tube is freely rotatable during the printing operation, and which shall swing the articles through an arc of ninety degrees while transferring from one position to another.

Still a further object of the invention is to provide an operating mechanism for the bottle gripping members employing a Geneva drive and differential gearing whereby the gripping member is subjected to angular and swinging movement simultaneously.

These and other objects of the invention will become more apparent from a consideration of the accompanying drawings, constituting a part hereof, in which like reference characters designate like parts, and in which Fig. 1 is a side elevational view of a printing machine embodying the principles of this invention;

Fig. 2 a front elevational view thereof;

Fig. 4 is a side elevational view of the drive and transfer mechanism of Fig. 3;

Figure 7:
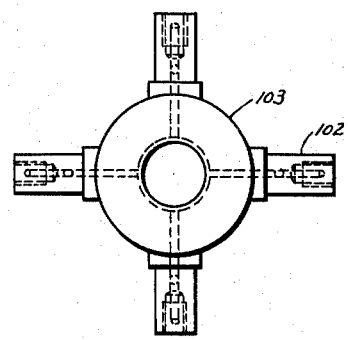
Figure 8:
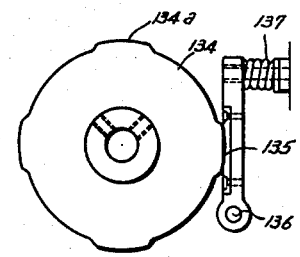
Figure 10:
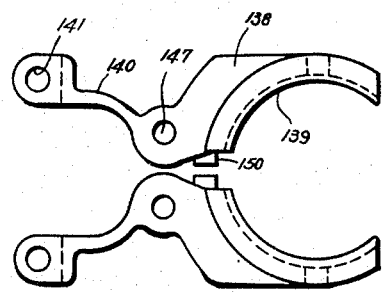
Figure 11:
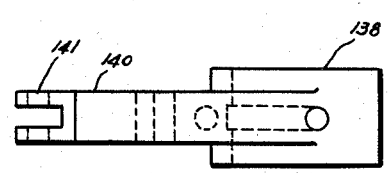
Figure 9:
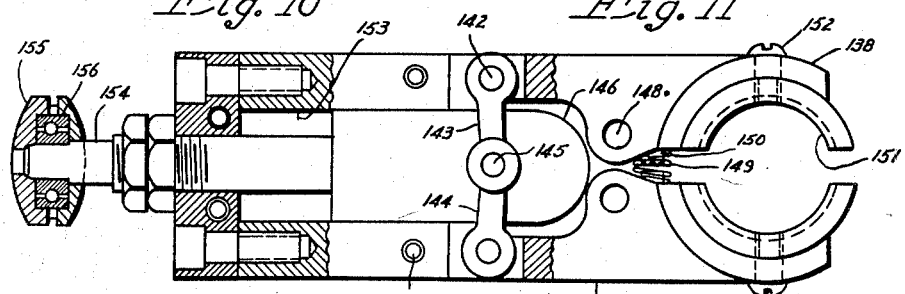

Figs. 5 and 6 rear and side elevational views, respectively, of a cam drive mechanism;

Fig. 7 a front elevation view of a spider for carrying gripping mechanism;

Fig. 8 a front elevational view of a brake mechanism;

Fig. 9 a view, partially in elevation and partially in cross section, of a gripping mechanism;

Fig. 10 a top plan view of the gripping jaws of the mechanism shown in Fig. 9;

Fig. 11 a side elevational view of the jaws shown in Fig. 10; and

Figure 12:
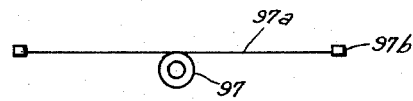

Fig. 12 a front elevational view diagrammatically illustrating a flexible cord drive.

With reference to the several figures of the drawings, the structure therein illustrated comprises a frame structure made of angle bars 1, 2, 3, 4, 5, 6, 7, 8 and 9, having cross braces 10, 11, 12 and 13 constituting a machine base, the uprights 4 and 5 extending beyond the cross bars 8 to support channel 14. Mounted on the cross members 9 is a motor block 15 carrying a motor 16 having a drive connection 17 with a wheel 18 for rotating counter-shaft 19 on which is mounted a drive wheel 20 connected to a speed reduction mechanism 21.

Figure 1:
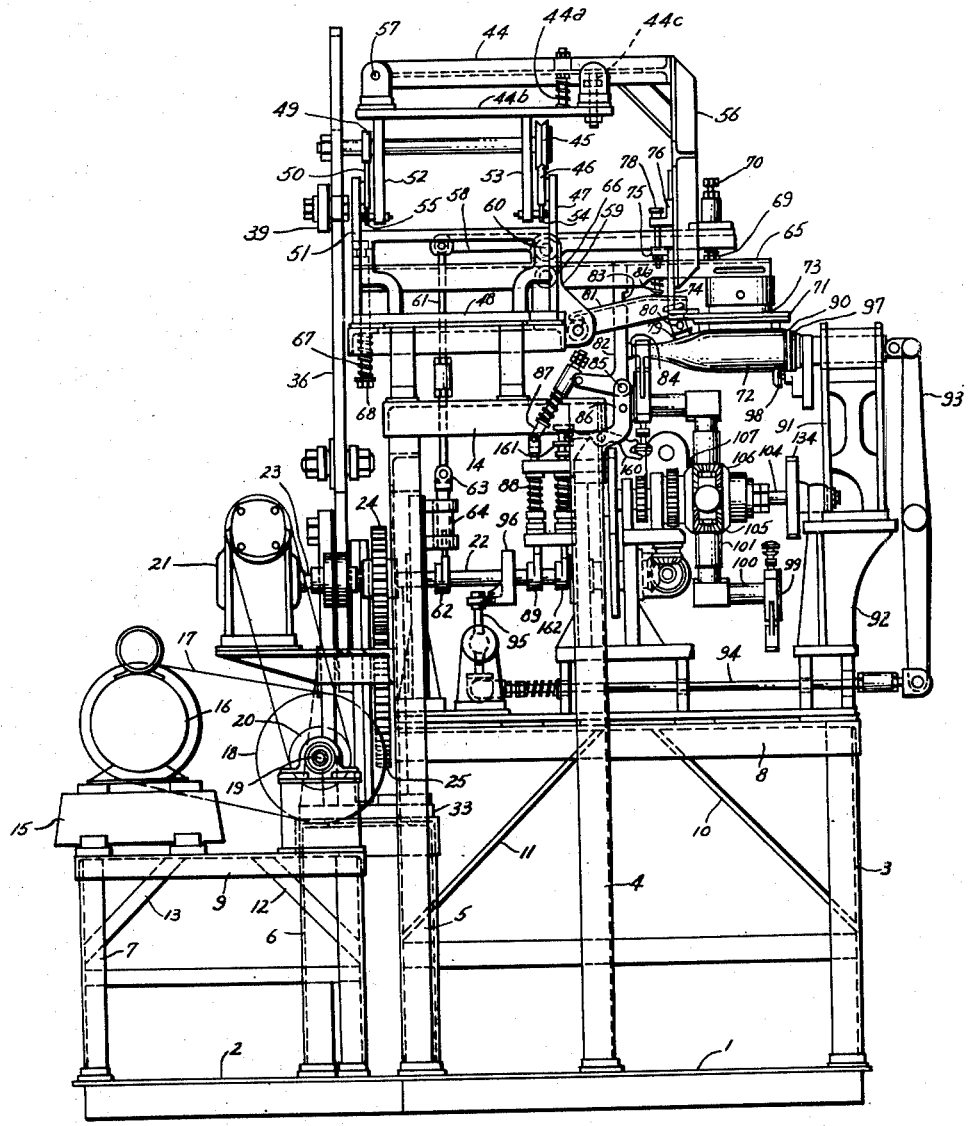
Figure 2:
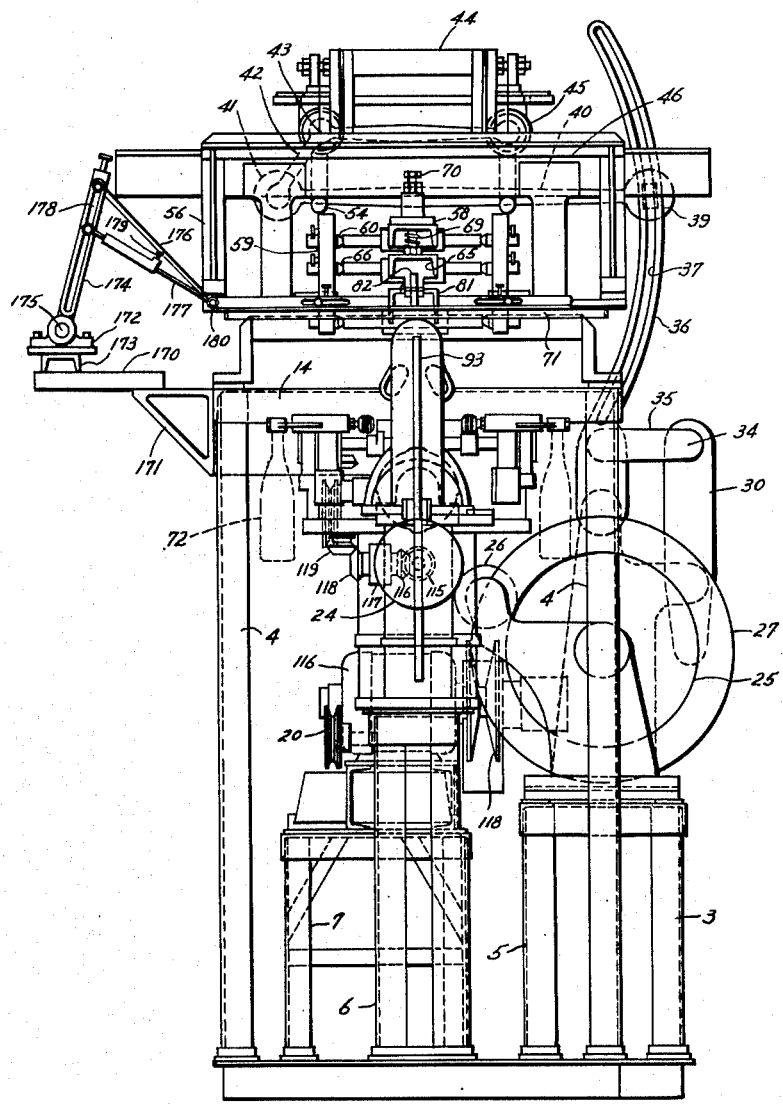

A cam shaft 22 is coupled to the shaft 23 of the speed reduction mechanism 21, and a gear wheel 24, rotating with the cam shaft 22, drives a gear wheel 25 through an idler gear 26 shown in dotted lines in Fig. 2. The gear wheel 25 is mounted to drive cam wheel 27, the cam face 28 of which engages a follower 29, Figs. 5 and 6, that is mounted on a lever 30 pivoted at 31 on a pedestal 32 supported on the block 33, Fig. 1. The follower lever 30 is pivotally connected at 34 to a link 35 which is connected to a rocker arm 36 at 37, arm 36 being pivotally mounted at 38 on pedestal 32.

As shown in Figs. 1 and 2, the arm 36 is provided with a slot 37 for adjustably mounting the end 39 of a cross link, shown in dotted lines and designated by the numeral 40, the cross link being connected at its other end 41 to a link 42 pivotally connected at 43 to a carriage 44. Carriage 44 is provided with a grooved wheel 45, Fig. 1, that rides on a track 46 supported by a bracket 47 on a support 48 that rests upon the angle bars 14. Carriage 44 is further provided with a flat faced wheel 49 that rides on a flat track 50 supported by an arm 51 on the cross frame 48. Arms 52 and 53 of the carriage extend downward to below the tracks 46 and 50 and are provided with rollers 54 and 55 to maintain the carriage solidly upon the tracks 46 and 50. By rocking motion of the arm 36, the carriage is moved back and forth on the tracks 46 and 50, and by adjusting the end 39 of the link 40 in the slot 47 of the arm 36, different degrees of movement of the carriage may be effected.

The carriage is provided with an angle frame 56 that is pivoted at 57 to permit vertical pivotal movement, the arm 56 being actuated by a rocker arm 58 pivoted to bracket 59 at 60, the arm 58 being connected by a link 61 that is subjected to vertical reciprocatory movement by a cam 62 on cam shaft 22, links 61 being pivotally connected at 63 to a cam follower 64. The rocker arm 58 actuates a squeegee arm 65, pivotally mounted at 66 to the bracket 59, the squeegee arm 65 being spring loaded by the spring 67 that rests against cross member 48 and is disposed around a bolt 68 that is fastened to one end of the squeezee arm. The rocker arm 58 rests on the squeegee arm 65, having yielding contact therewith through a spring connection 69 which is adjustable by screw nuts 70 to provide suitable tension on the squeegee arm.

Supported on the arm 56 of the carriage frame is a screen 71 which carries printing fluid that is printed on an object, such as a bottle 72, by virtue of a squeegee 73 carried by arm 65 and rubbing on the screen 71. The screen is connected to the arm 56 by a bracket 74 fastened by angle brackets 75 and 76 and by a bolt 78. Bracket 74 also carries a screen 79 for printing the shoulder of the bottle 72, a squeegee 80 cooperating with the screen 79 by means of a squeegee arm 81. The squeegee arms 65 and 81 are prevented from contacting their respective screens 71 and 79 to avoid displacing color when no bottle is in position below the screens. This is accomplished by means of a bell crank lever 82 which is notched at 83. As shown in Fig. 2, squeegee arms 65 and 81 are channel members, the arm 81 being slotted to receive the bell crank lever 82.

The bell crank lever 82 is provided with a plunger 84 that engages the inside of the bottle neck when lever 82 is in the vertical position as shown in Fig. 1. In this position the notch 83 clears the slot in the squeegee arm 81, permitting the latter to lower, and squeegee arm 65 may likewise reach its lowermost point before abutting the top edge of the lever 82. If, however, no bottle is engaged by plunger 84, lever 82 is tilted forward to the right, as viewed in Fig. 1 of the drawings. In this position notch 83 will engage the arm 81 and a corner of the top of lever 82 will prevent the arm 65 from lowering, so that no contact of the squeegees 73 and 80 is made with the screens 71 and 79. This is a safety feature to prevent the extrusion of ceramic coloring material or ink from the screen when no bottle is engaged by the plunger 84.

Lever 82 is pivoted at 85 on a bracket 86 and is actuated by links 87 and 88 and cam 89 on the cam shaft 22. Bottle 72 is also engaged by a chuck 90 at the base of the bottle, which is mounted for sliding movement in a stationary bracket 91 supported on a pedestal 92. The chuck is moved into and out of engagement with the base of the bottle by means of a lever 93 connected by a link 94 to an oscillating arm 95 that is actuated by cam 96 on cam shaft 22. The chuck 90 is rotated by a small sheave wheel 97 around which is wrapped a flexible cord 97a that is attached to arms 97b of the screen frame 71, as shown in Fig. 12, so that when the carriage is moved on the tracks 46 and 50 the chuck 90 is rotated at the same speed as the carriage. The linear speed of the face of the screen 71 that contacts the bottle is the same as the linear speed of the bottle surface. Guide rollers 98 support bottle 72 when in position for printing, as shown in Fig. 1.

The linear speed of the screen frame 79 for printing the shoulder of the bottle 72 is adjusted to the linear speed of the screen frame 71 for printing the body of the bottle 72 by means of a pantograph mechanism, shown on an angle bracket 171 on the upright angle member 4. A pivot block 172 is mounted on a channel 173 supported on base 170 for pivotally mounting a rocker arm 174 and 175. The rocker arm is provided with links 176 and 177 which are adjustably mounted in a slot 178 of the arm 174 and the link 177 is a telescopic member adjustable for length by set screw 179. Link 177 is pivotally connected to the screen frame 71 at 180 and link 176 is pivotally mounted to the screen frame 79 of the shoulder printing device. By adjusting the relative length of the links 176 and 177 through the adjusting screw of the telescopic member 179, the relative linear speed of the screens 71 and 79 may be regulated in accordance with the relative sizes of the body of the bottle 72 and the neck of the bottle 72. In this manner the rate of surface travel of the screen is made to correspond to that of the shoulder and body surfaces of the bottle 72 or other container being printed.

The top frame 44 of the carriage is spring loaded by the spring 44a which rests on a supporting plate 44b of the carriage frame 52 and 53. Carriage frame 44 is maintained in proper alignment by a guide pin 44c. The bottles or other articles to be printed are fed to the machine and moved to the proper position for printing as shown in Fig. 1 by means of the mechanism shown in Figs. 3, 4 and 7 to 11 inclusive, of the drawings.

A plurality of gripping members, generally designated by the numeral 99, are mounted on arms 100 having sleeves 101 that are rotatably mounted on arms 102 of a spider 103, Fig. 7, that is mounted on shaft 104, Figs. 1 and 4. The sleeves 101 are provided with bevel gears 105, the teeth of which interact with the teeth of bevel gears 106 and 107, whereby the arms 100 of the gripping members 99 are subjected to angular movement by rotation of the sleeves 101 while the spider 103 is revolving. The gripping and feed mechanism is driven in proper timed relation to the cam actuated squeegee arms and chucking mechanism by means of a pair of Geneva wheels 108 and 109, the latter being mounted on the cam shaft 22 by which it is driven. As noted in Fig. 3, the star wheel 108 has four slots 110 which are engaged by the drive pin 111 of the wheel 109, and four dwell surfaces 112 which contact the cylindrical surface 113 of the drive wheel 109. During contact with the dwell surface 112, the star wheel 108 is idle and no movement of the shaft 104 carrying the gripping support spider is had. During this period the gripping members 99 are in the position of gripping or releasing bottles, which will be hereinafter more fully described.

Figure 3:
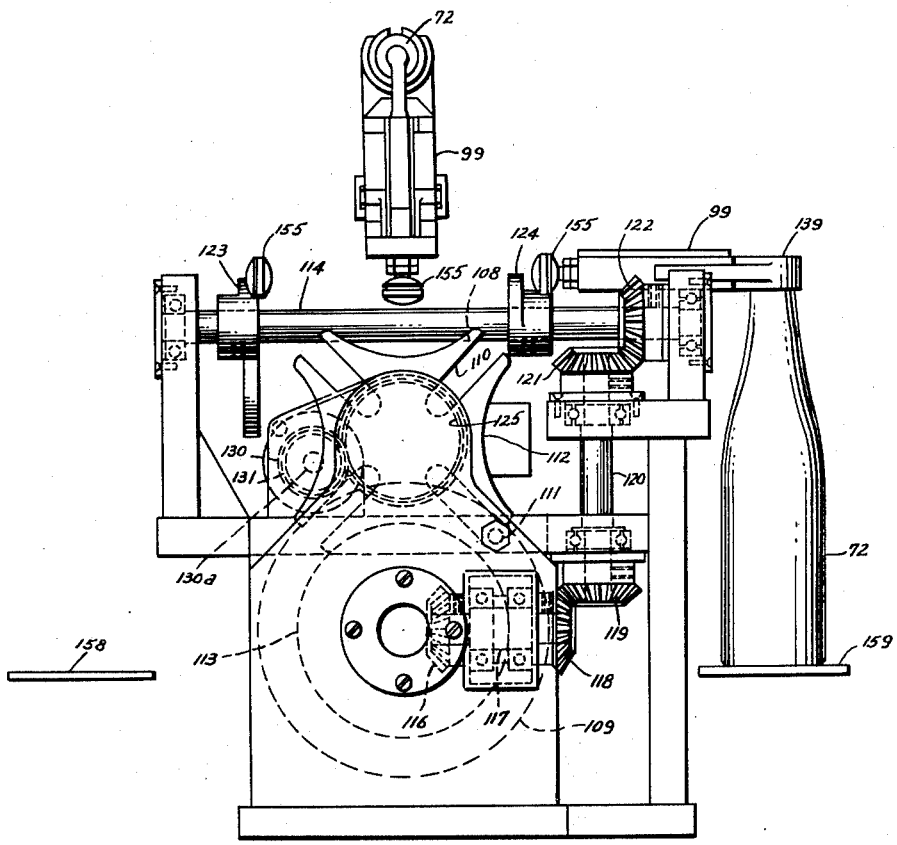
Fig. 3 is a front elevational view of a Geneva drive and transfer mechanism.

Rotation of the gear 107 and of cam shaft 114, Fig. 3, is effected through a plurality of miter gears, one of which, 115, is secured to the end of cam shaft 22 to rotate miter gear wheel 116, Figs. 3 and 4, which is mounted on a short spindle 117 on the end of which a miter gear 118 is mounted. The latter gear interacts with a miter gear 119 that drives a vertical spindle 120, Fig. 3, on which is mounted miter gear 121, the teeth of which interact with miter gear 122 that drives the cam shaft 114. Cams 123 and 124 are mounted to rotate with the cam shaft 114 for actuating the bottle gripping mechanism, as will be hereinafter explained.

Mounted on the shaft 104 is a gear wheel 125 that is keyed on the shaft 104, as shown at 126. A pedestal bearing 127 carries ball races 128 for journaling shaft 104, the outer ends of which are journaled in a pedestal bearing 129 and in bearing 129a, Fig. 4. Gear wheel 125 meshes with a gear wheel 130, Fig. 3, on a short counter-shaft 130a on which is mounted a gear wheel 131 that meshes with the gear wheel 132, Fig. 4, which is journaled on ball bearings 133. Gear wheel 132 is integral with bevel gear 107, and the gear reduction from the take-off gear 125 through gears 130 and 131 to the gear 132 provides a two to one ratio, so that bevel gear 107 travels at one-half the speed of the shaft 104. A brake 134 is mounted on shaft 104 and, as shown in Fig. 8, has brake lugs 134a that are engaged by a brake shoe 135 pivoted at 136 and spring loaded by the spring 137; the lugs 134a corresponding to the position of the gripper members 99 so that there can be no over-travel of the feed mechanism.

With reference to Figs. 9 to 11, inclusive, of the drawings, the gripping members 99 consist of gripping fingers 138 having jaws 139 corresponding in shape to the article to be gripped, such as tube containers or the finish or neck of a bottle, as shown in Figs. 1 and 4. Fingers 138 are provided with arms 140 with drill holes 141 for receiving pins 142 of toggle links 143 and 144 that are pivotally connected at 145 to a plunger 146. Fingers 138 are also pivoted at 147 to pins 148 and are yieldingly biased by a coil spring 149 disposed around lugs 150, Fig. 10 of the drawings. Liners 151, corresponding in shape and size to different sizes of containers to be gripped may be secured to the fingers 138 by screws 152.

As shown in Fig. 9, plunger 146 that actuates fingers 138 is mounted in a slide 153 having an extension 154 with a substantially elliptically shaped head 155 that is mounted on ball bearings 156 to permit free rotation of the head 155 on the plunger extension 154 when the heads 155 are engaged by the various cams in their different positions, as will be hereinafter explained. The gripping devices are mounted on the arms 100 by screws extending through the openings 157, Fig. 1.

An important feature of the gripping members 99 is that by means of the toggle links 143 and 144 the gripping jaws cannot be opened, except by movement of the plunger 146 actuated through the heads 155. The jaw fingers cannot otherwise be separated by any strains imposed upon their gripping surfaces 151.

The operation of the ware gripping and feeding mechanism is briefly as follows.

As viewed in Fig. 3, which is viewing the machine from the front, a bottle 72 is held with its axis vertically disposed by one of the gripping members 99. Another bottle is similarly held on the left-hand side by a gripper, of which the head 155 alone is shown. Another gripping mechanism 99 at the top of Fig. 3 is shown gripping the neck of a bottle 72, the axis of which is in a horizontal plane and which corresponds to the position of the bottle shown in Figs. 1 and 4. The fourth gripping member on the spider 104 is in a down position and not shown, and does not hold any bottle.

The present apparatus is especially designed for use with conveyors which may be endless belts, designated by the reference numerals 158 and 159, on which rows of bottles are conveyed to and from the labeling machine.

In the position of the bottle shown in Fig. 3, it is being discharged from the machine and cam 124 has displaced the plunger head 155 in the direction of the bottle to open the gripping jaws 139, leaving the bottle supported on the conveyor 159. At the same time cam 123 has engaged plunger head 155 of the left-hand gripping mechanism, not shown, to close the jaws 139 to grip a bottle that is supported on conveyor 158. Since cam shaft 22 is continually rotating, the next movement of the Geneva wheel 108 will rotate shaft 104 ninety degrees, or a quarter turn of the spider 103, Fig. 7, that carries the gripper supporting structure, and the gripper 99 holding the bottle 72 in the horizontal position will be moved to the position of the gripper 99 holding bottle 72 shown on the right-hand side of Fig. 3 of the drawings, at the same time moving the bottle from the left-hand side, supported on conveyor 158, to the upper position. As the Geneva wheel is indexing, cam 96 operates arm 95 to actuate lever 93 that operates the chuck 90 for engaging the base of the bottle 72 as viewed in Fig. 1. At the same time, the bell crank lever 82 carrying the plunger 84 is actuated to bring the plunger in engagement with the finish or mouth of the bottle 72. The gripper mechanism 99 is then opened by lever 160, Figs. 1 and 4, which engages the plunger head 155, and is actuated by a spring biased plunger 161 and cam 162, the lever 160 being pivoted on the bracket 86 at 163. Coil springs 164, 165 and 166 maintain the operating mechanism under tension to assure positive action thereof.

The bottle gripping and transfer mechanism is coordinated with the carriage sliding mechanism through the shaft 22, as heretofore explained, so that the carriage frame carrying the screens 71 and 79 is moved on tracks 46 and 50 by the arm 36, the bottle to be labeled being in the upper horizontal position as shown in Fig. 1. At the same time, cam shaft 22 driving cam 62 causes the rocker arm 58 to bend down on the squeegee arm 65 to bring the squeegee in contact with the screen to force the labeling color through the screen to the surface of the bottle while the bottle is rotated through the chuck 90 and the connecting flexible cord 97a that is movable with the screen. Also the shoulder label is simultaneously printed through the screen 79 by the squeegee arm 81 bearing down through the connecting spring plunger 81a. When no bottle is in the position shown in Fig. 1 and the machine is operating, the squeegee arms will not come down to contact the screen because in that position the arm 82 will hold the squeegee arm from lowering to contact the screens. It is only when the plunger 84 is seated in a bottle that arm 82 is in the proper position to clear the squeegee arms 65 and 81.

The gripper arms 100 are swung through an angle of ninety degrees when the spider 103 indexes ninety degrees by the bevel gear 107 which rotates the pinion sleeves 100, the gear 107 being rotated at one-half the speed of the Geneva wheel that rotates shaft 104, the gear ratio of the gear wheels 107 and 105 being two to one, which brings the speed of movement of the gripper arms 100 to the same speed of the indexing movement to give the ninety degree swing of the arm. Gear wheel 106, as shown in Fig. 4, idles on the shaft 101 and more or less functions as a bearing support for the gears 105.

In the complete cycle of operation of the machine, a bottle is lifted from the conveyor 158, Fig. 3, raised to the upper position as shown in Figs. 1 and 3, where the label is printed thereon, and then lowered to rest on the conveyor 159. The conveyor movements are timed with the indexing movements of the machine, and the bottles are spaced in rows on conveyor 158 so that they will be in alignment with the grippers 99 when they close upon the bottle necks by action of the cams 123. Likewise the bottles will again be spaced on the conveyor 159 when they are released by the cams 124. The lever 160 that operates the plunger head 155 to open the same when the bottle is chucked, as shown in Fig. 1, will also operate to close the gripper 99 to again grip the bottle when the label has been printed thereon. The brake mechanism shown in Fig. 8, as previously explained, will hold the indexing mechanism in position for each indexing movement.

Although the invention has been demonstrated as for applying ceramic coloring to round bottles, it may obviously be used for printing cylindrical or flat surfaced containers other than bottles, and of other materials than glass, since the feature of the invention is the automatic feeding of articles to be printed, to and from the printing position.

Although one embodiment of the invention has been herein illustrated and described, it will be evident to those skilled in the art that various modifications may be made in the details of construction without departing from the principles herein set forth; for example, the article handling mechanism may be employed with other established mechanism that can be synchronized to perform functions other than printing labels on bottles.

I claim:

1. In apparatus for printing labels on bottles or the like, means for gripping the article to be printed and for transferring the same to position in register with the printing device, said means consisting of a shaft actuated by a Geneva drive to subject the shaft to angular movements in increments of a revolution, a set of planetary gears mounted on the driven shaft including a spider, sleeve gears mounted on said spiders constituting a part of the differential gearing, arms carried by said sleeve gears having gripping members mounted thereon consisting of gripping jaws, plungers for actuating said jaws and toggles connecting said plunger and jaws, and means in the path of movement of said plungers for engaging the plungers to actuate the same for gripping or releasing the articles to be printed in the different index positions of said gripping jaws.

2. In apparatus for printing labels on bottle or the like, means for gripping the article to be printed and for transferring the same to position in register with the printing device, said means consisting of a shaft actuated by a Geneva drive to subject the shaft to angular movements in increments of a revolution, a set of planetary gears mounted on the driven shaft including a spider, sleeve gears mounted on said spiders constituting a part of the differential gearing, arms carried by said sleeve gears having gripping members mounted thereon consisting of gripping jaws, plungers for actuating said jaws and toggles connecting said plunger and jaws, means in the path of movement of said plungers for engaging the plungers to actuate the same for gripping or releasing the articles to be printed in the different index positions of said gripping jaws, and gear reduction mechanism consisting of a pinion mounted on the driven shaft, a gear wheel connected to rotate with one of the gears of the planetary gear mechanism, and a gear and pinion mounted on a countershaft and meshing with said first-named pinion and gear to actuate one of the sun gears of the planetary gear mechanism at a speed different than the speed of rotation of the driven shaft.

3. In a machine for printing labels on bottles and the like, a bottle handling device including a rotable shaft, means for rotating the shaft, a spider secured to the shaft, said spider having a plurality of radial arms, gear means positioned adjacent the spider and rotatably mounted on the shaft axis, a first arm rotatably mounted on each spider arm, gear means carried by each of said first arms which cooperates with the first mentioned gear means to rotate the first arms about their longitudinal axes as the spider is rotated, a second arm mounted at right angles on the outer end of each first arm and gripper means carried at the outer end of each second arm and positioned with their longitudinal axes at right angles to said second arm, and means for operating said gripping means to grip and release a bottle.

References Cited in the file of this patent

UNITED STATES PATENTS

| | | |
|---|---|---|
| 569,939 | Sawyer | Oct. 20, 1896 |
| 592,499 | Stephens | Oct. 26, 1897 |
| 1,220,899 | Sorensen | Mar. 27, 1917 |
| 1,455,613 | Heppenstall | May 15, 1923 |
| 1,888,829 | McDowell | Nov. 22, 1932 |
| 1,958,846 | Christensen | May 15, 1934 |
| 1,999,742 | Smith | Apr. 30, 1935 |
| 2,061,085 | Price | Nov. 17, 1936 |
| 2,207,351 | McLaughlin et al. | July 9, 1940 |
| 2,224,975 | McNamara | Dec. 17, 1940 |
| 2,231,535 | Jackson et al. | Feb. 11, 1941 |
| 2,261,255 | Jackson | Nov. 4, 1941 |
| 2,415,997 | Elred | Feb. 18, 1947 |